US007532199B2

(12) United States Patent
Kubo et al.

(10) Patent No.: US 7,532,199 B2
(45) Date of Patent: *May 12, 2009

(54) INPUT APPARATUS

(75) Inventors: Satoko Kubo, Tokyo (JP); Hiroyuki Ohnuma, Chiba (JP); Haruhiko Yata, Kanagawa (JP)

(73) Assignee: Sony Corporation (JP)

( * ) Notice: Subject to any disclaimer, the term of this patent is extended or adjusted under 35 U.S.C. 154(b) by 639 days.

This patent is subject to a terminal disclaimer.

(21) Appl. No.: 11/178,980

(22) Filed: Jul. 11, 2005

(65) Prior Publication Data

US 2006/0170569 A1    Aug. 3, 2006

(30) Foreign Application Priority Data

Jul. 12, 2004   (JP)   ............................ P2004-205203
Jul. 12, 2004   (JP)   ............................ P2004-205204
Nov. 24, 2004  (JP)   ............................ P2004-339283

(51) Int. Cl.
G09G 5/08 (2006.01)

(52) U.S. Cl. .................... 345/161; 345/158; 463/38

(58) Field of Classification Search ................ 345/158, 345/161, 179; 348/734; 379/433.13; 341/22; 273/148; 463/38; 455/575.1; 400/472; 200/1 R, 200/5 A, 341, 520

See application file for complete search history.

(56) References Cited

U.S. PATENT DOCUMENTS 6,163,326 A * 12/2000 Klein et al. .................. 345/156
7,220,925 B2 * 5/2007 Kubo et al. .................. 200/5 A

FOREIGN PATENT DOCUMENTS

JP      05-211693 A     8/1993
JP      2001-346281 A   12/2001

* cited by examiner

*Primary Examiner*—Abbas I Abdulselam
(74) *Attorney, Agent, or Firm*—Lerner, David, Littenberg, Krumholz & Mentlik, LLP

(57) ABSTRACT

An input apparatus compact and superior in operability is disclosed wherein, in either a folded or unfolded position, a joystick control can exhibit the same operations and an optical signal from a transmission section can be transmitted with certainty. The input apparatus includes first and second operation housings each having a plurality of input buttons, the first and second operation housings being connected for folding motion by a hinge section. The joystick control is disposed on an axis of the hinge section and has an outer circumferential portion on which input buttons are provided. The joystick control is exposed in both the folded and unfolded positions so that the same input operations can be performed. Also, a signal is transmitted from the input apparatus in both the folded and unfolded positions of the second operation housing.

11 Claims, 12 Drawing Sheets

FIG.10A
FIG.10B
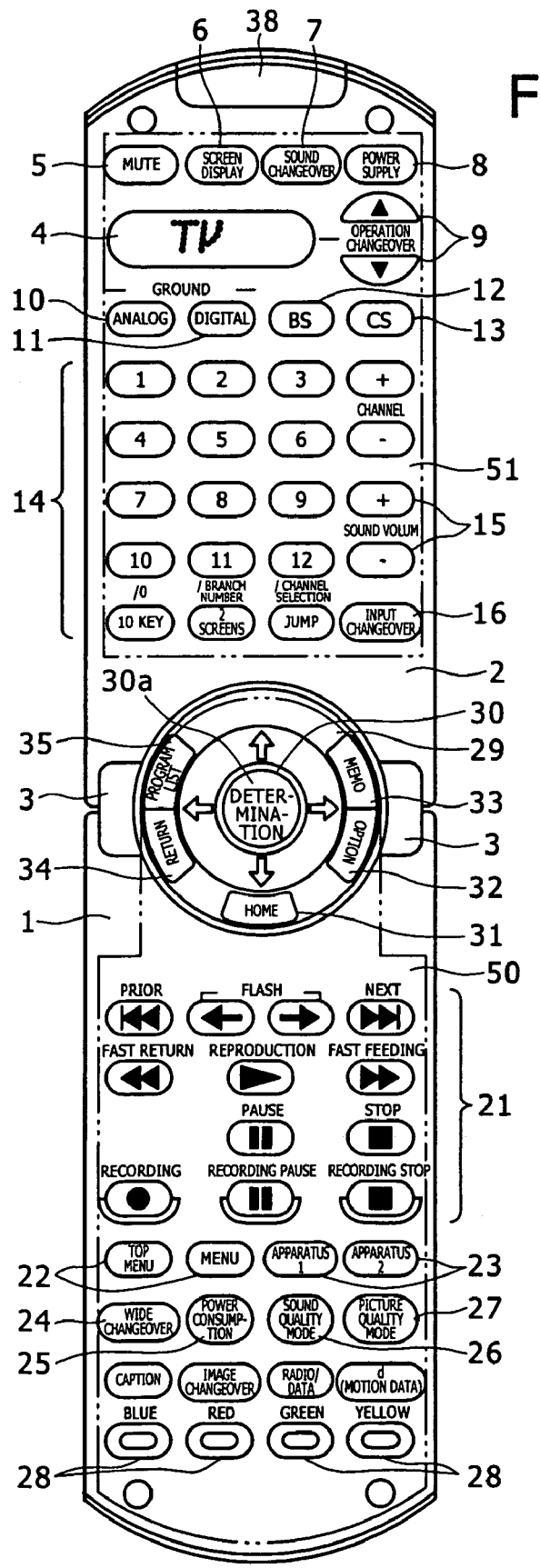
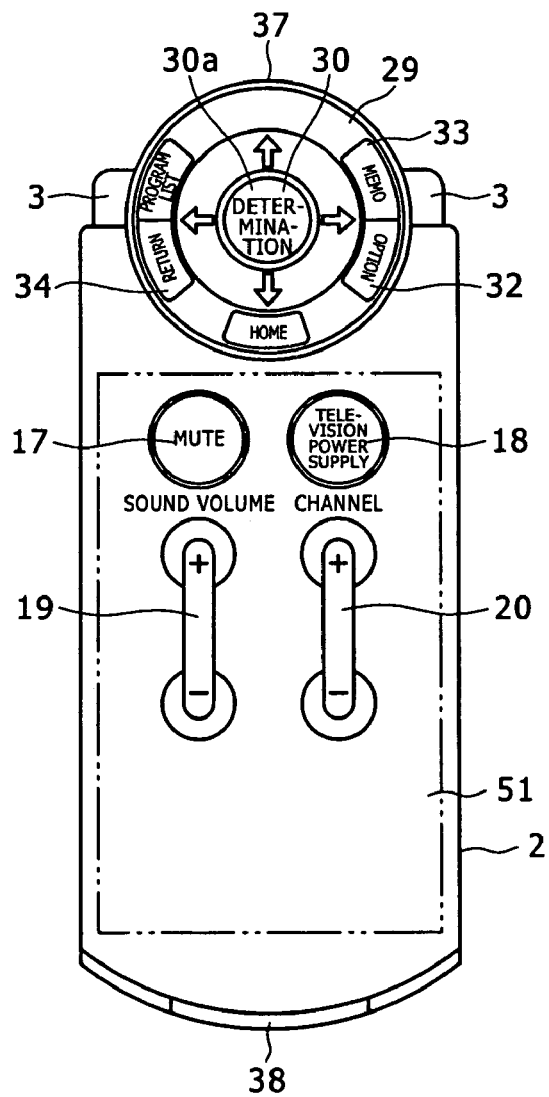

INPUT APPARATUS

CROSS-REFERENCE TO RELATED APPLICATIONS

The present application claims priority from Japanese Application Nos. 2004-205203 filed Jul. 12, 2004, 2004-205204 filed Jul. 12, 2004, and 2004-339283 filed Nov. 24, 2004, the disclosures of which are hereby incorporated by reference herein.

BACKGROUND OF THE INVENTION

This invention relates to an input apparatus such as a remote commander for remotely controlling an image apparatus, such as, for example, a television set (TV), and more particularly to an input apparatus of the type described which is of a foldable type so as to make the input apparatus compact and have a high handling facility and operability.

Recently, most of electronic apparatus for home use such as audiovisual (AV) apparatus including televisions sets and disk players and other electronic apparatus can be remotely controlled using a remote commander.

Here, a remote commander for a television set is described as an example. As a recent remote commander for a television set, a remote commander has been proposed which includes operation buttons for selecting a BS (broadcasting satellite) high definition broadcast, a BS digital broadcast, a ground wave analog broadcast, a ground wave digital broadcast, a CS (communication satellite) digital broadcast and a data broadcast and operation buttons for selecting a channel. A remote commander of the type described is disclosed, for example, in Japanese Patent Laid-Open No. 2001-346281.

Also, a remote commander has been proposed which includes, in addition to such operation buttons for broadcast selection as described above, buttons for controlling a video player.

From the foregoing, recent remote commander tend to have an increased number of operation buttons and have an increased size, particularly in the vertical direction. However, the increase in size of the remote commander makes handling of the remote commander complicated and cumbersome. Besides, since a great number of buttons are disposed on the same plane, operation of the buttons is complicated, and this makes the remote commander less convenient in use.

From such reasons, a remote commander of the foldable type has been proposed and is disclosed, for example, in Japanese Patent Laid-Open No. Hei 5-211693.

For example, if the foldable remote commander disclosed in Japanese Patent Laid-Open No. Hei 5-211693 includes a joystick control section having a cross media bar (XMB) (registered trademark) function, there is a problem in that the remote commander may possibly be operated in error because the joystick control section has different functions in use depending upon whether the remote commander is in a folded state or in an unfolded state.

Further, the joystick control section may be formed such that it does not function when the remote commander is in the folded state. Further, since the joystick control section is disposed on the surface of the remote commander, a comparatively great occupation area is required by the joystick control section, and this increases the vertical size of the remote commander itself.

Further, since usually an infrared transmission section of a remote commander transmits an infrared ray signal toward a reception apparatus such as a television set while it is held by a hand of a user, it is provided at an end portion of a housing of the remote commander. However, for example, in the case of a foldable remote commander, if the infrared transmission section of the remote commander is provided at an end portion of the housing of a movable side housing of the remote commander, then when the movable side housing of the remote command is unfolded, there is no problem. However, when the movable side hosing of the remote commander is folded, the infrared transmission section is directed reversely and hence does not function.

On the other hand, where the infrared transmission section of the remote commander is provided at an end portion of a body of the remote command which is held by a hand of a user, there is no problem when the movable side housing of the remote commander is folded. However, when the movable side housing of the remote commander is unfolded, the remote commander housing unfavorably disturbs the infrared transmission section or deteriorates the directivity of the infrared rays.

SUMMARY OF THE INVENTION

It is an object of the present invention to provide an input apparatus which is compact and superior in operability and wherein, in whichever one of a folded position and an unfolded position the input apparatus is, a joystick control section can exhibit the same operations.

It is another object of the present invention to provide an input apparatus wherein, in whichever one of a folded position and an unfolded position the input apparatus is, transmission of infrared rays or the like from a transmission section can be performed with certainty and which is compact and superior in operability.

In order to attain the objects described above, according to an embodiment of the present invention, there is provided an input apparatus, including a first operation housing having a plurality of first input buttons for performing a first group of functions, the first operation housing being adapted principally to be held; a second operation housing having a plurality of second input buttons for performing a second group of functions and a plurality of third input buttons for performing a third group of functions; a hinge section connecting the second operation housing to the first operation housing for pivotal movement between a folded position and an unfolded position, the third input buttons being operable while the first input buttons and the second input buttons are disposed between the first operation housing and the second operation housing in the folded position; and a joystick control section disposed integrally with the first operation housing on a center line of the hinge section and having an outer circumferential portion provided with fourth input buttons for performing functions corresponding to the first group of functions and the second group of functions; the joystick control section being exposed in both the folded position and the unfolded position so that input operations can be performed using the fourth input buttons.

With the input apparatus, since the same input operations can be performed in both the folded position and the unfolded position, handling of the input apparatus is easy and the operability of the input apparatus is high. Further, since the joystick control section is disposed at the hinge section between the first and second operation housings, the input apparatus can be formed compactly.

Preferably, the second operation housing includes a crescent-shaped cutaway portion adjacent the hinge section, and the second operation housing is moved between the folded position and the unfolded position such that the cutaway portion passes over the joystick control section. With the input apparatus, since the second operation housing is moved between the folded position and the unfolded position such that the crescent-shaped cutaway portion passes over the joystick control section, the joystick control section is always in an exposed state. Consequently, a high degree of operability can be assured.

Further preferably, while the second operation housing is positioned intermediately between the folded and unfolded positions, the joystick control section and the cutaway portion define therebetween a small gap having a size such that a finger cannot be inserted into the gap. With the input apparatus, since the gap between the joystick control section and the cutaway portion is made to be small, a finger cannot be inserted therein while the second operation housing is positioned intermediately between the folded and unfolded positions. Consequently, a situation in which a finger is inserted into the gap and injured by the cutaway portion can be prevented.

The third input buttons may be used with a comparatively high frequency. With the input apparatus, since the third input buttons are used with a comparatively high frequency, an input operation can be performed while the input apparatus is folded compactly.

According to another embodiment of the present invention, there is provided an input apparatus, including a first operation housing having a plurality of first input buttons for performing a first group of functions, the first operation housing being adapted principally to be held; a second operation housing having a plurality of second input buttons for performing a second group of functions; a hinge section connecting the second operation housing to the first operation housing for folding movement between a folded position and an unfolded position; and a pair of signal transmission sections including a first transmission section which serves as a signal transmission section when the second operation housing is in the folded position and a second transmission section which serves as a signal transmission section when the second operation housing is in the unfolded position.

With the input apparatus, in both the folded and unfolded positions, the input apparatus can transmit a signal with certainty to a signal reception section of a television receiver or the like. Consequently, the input apparatus has a high degree of operability. Further, the input apparatus is easy in handling and can be formed compactly.

Preferably, the first transmission section is provided on the hinge section, and the second transmission section is provided at an end of the second operation housing remote from the hinge section. With the input apparatus, since the first transmission section is provided on the hinge section and the second transmission section is provided at an end of the second operation housing remote from the hinge section, a signal of infrared rays or the like transmitted from the transmission sections is not intercepted at all but can be transmitted with high directivity.

The first and second transmission sections may be formed as infrared transmission sections which are changed over depending upon whether the second operation housing is in the folded position or in the unfolded position. With the input apparatus, since the first and second transmission sections are infrared transmission sections which are changed over depending upon whether the second operation housing is in the folded position or in the unfolded position, unnecessary consumption of a battery can be suppressed.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 10A and 10B are plan views showing the input apparatus shown in FIG. 9;

DETAILED DESCRIPTION

An input apparatus to which the present invention is applied is described below with reference to the drawings. The input apparatus of the embodiment described below is formed as a foldable remote commander which can control a television set and an external input apparatus connected to the television set.

Figure 1:
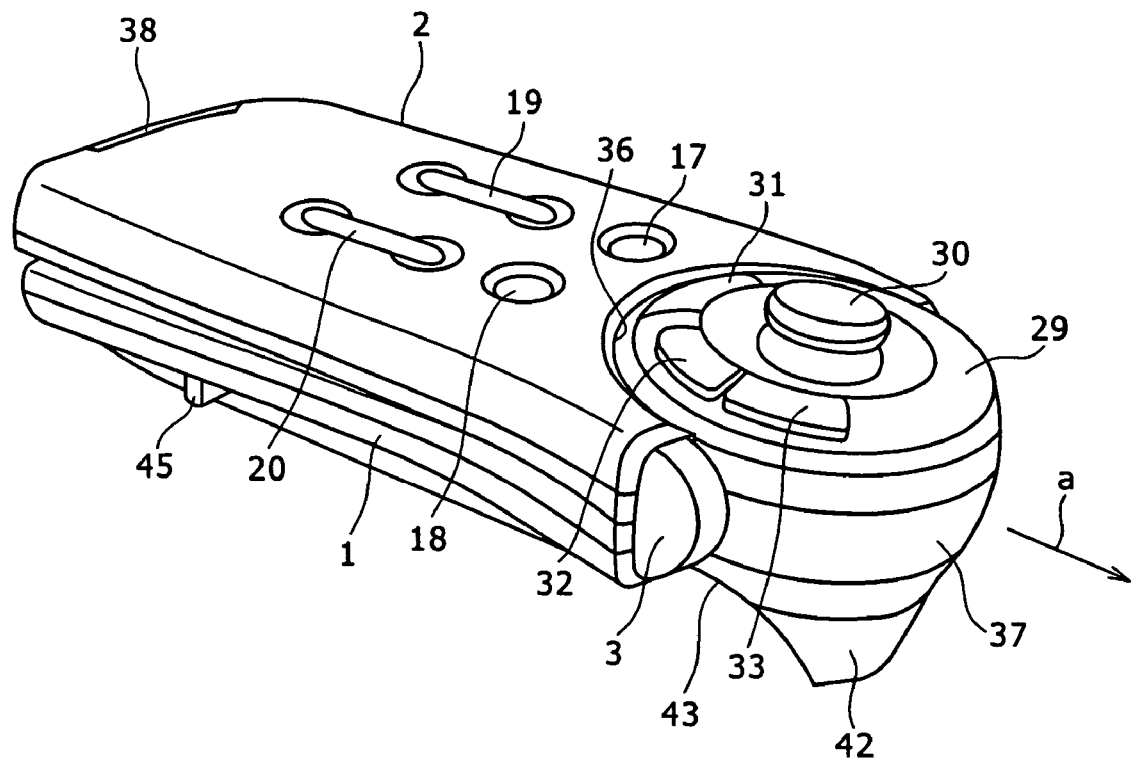
FIG. 1 is a perspective view of an input apparatus to which the present invention is applied in a folded state as viewed from above.
Figure 3:
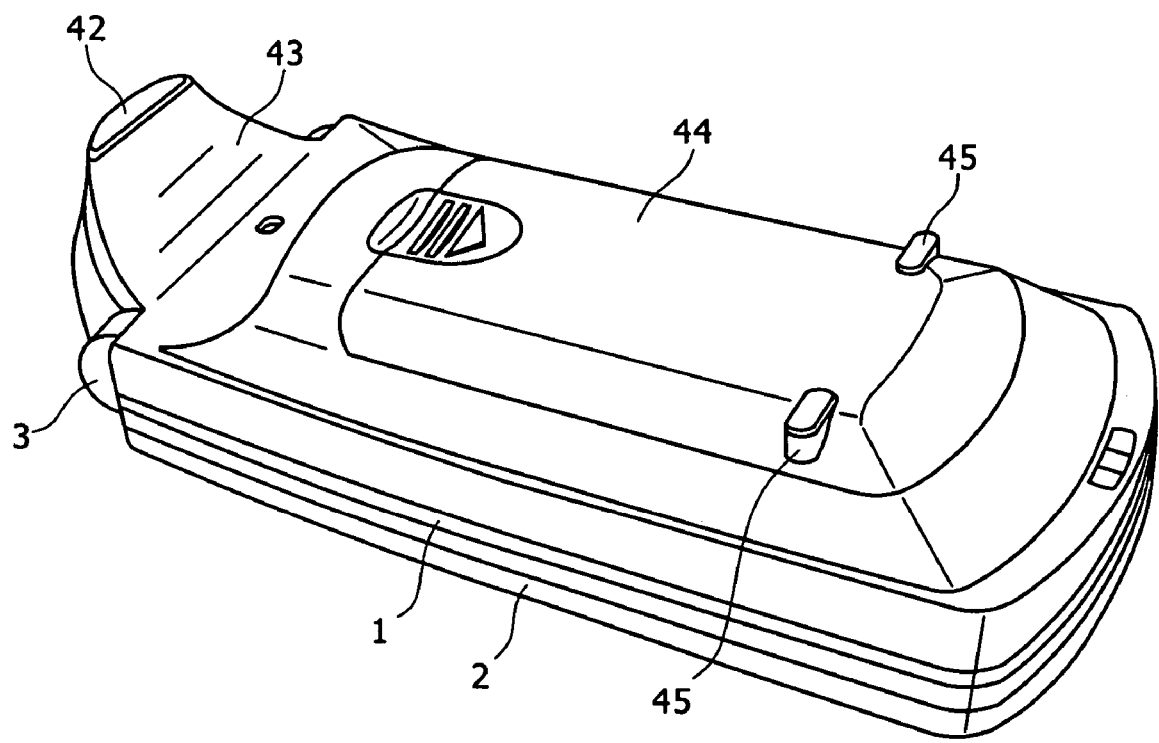
FIG. 3 is a perspective view of the input apparatus of FIG. 1 as viewed from the bottom side.
Figure 4:
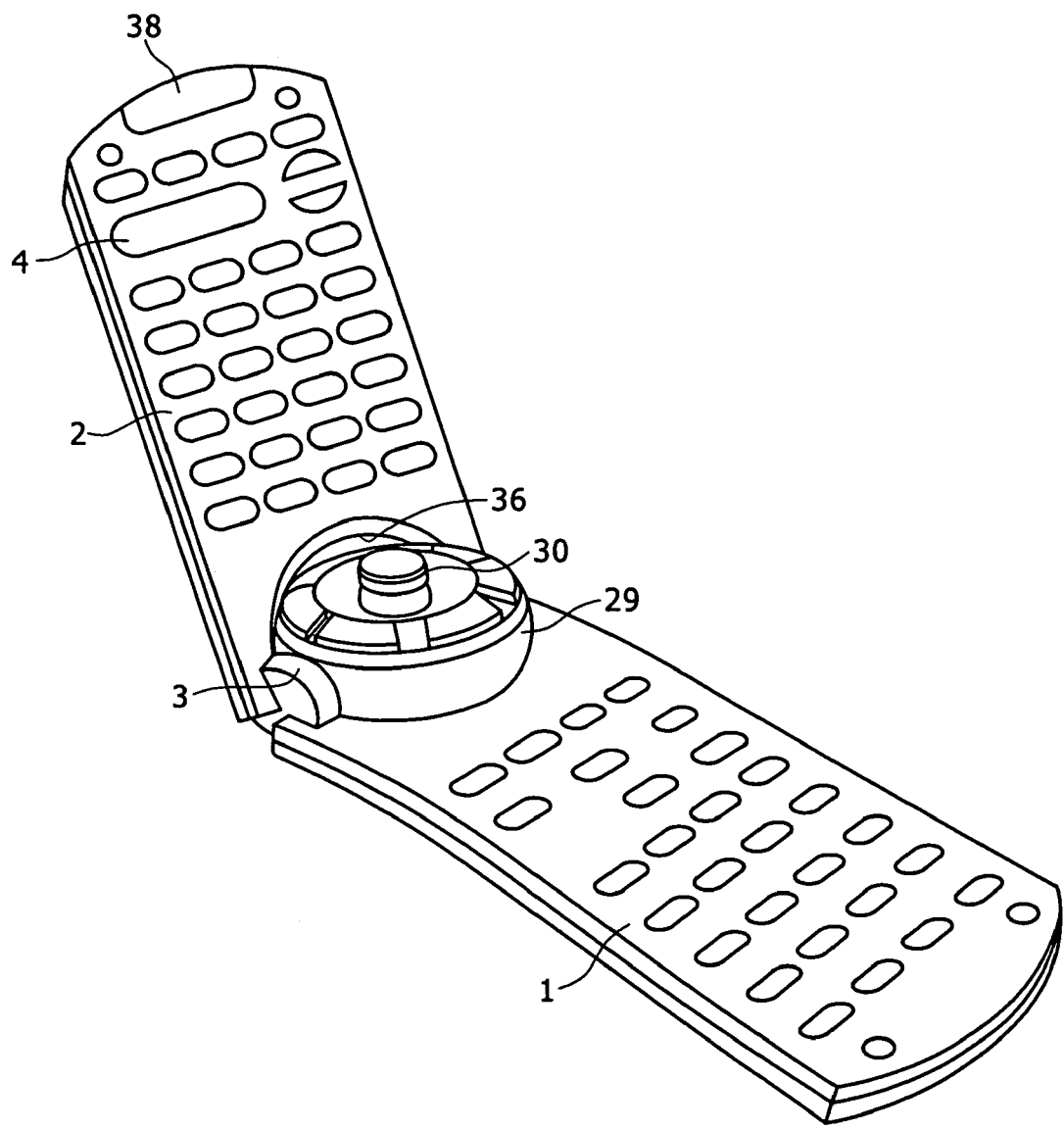
FIG. 4 is a perspective view of the input apparatus of FIG. 1 while it is being unfolded.
Figure 5:
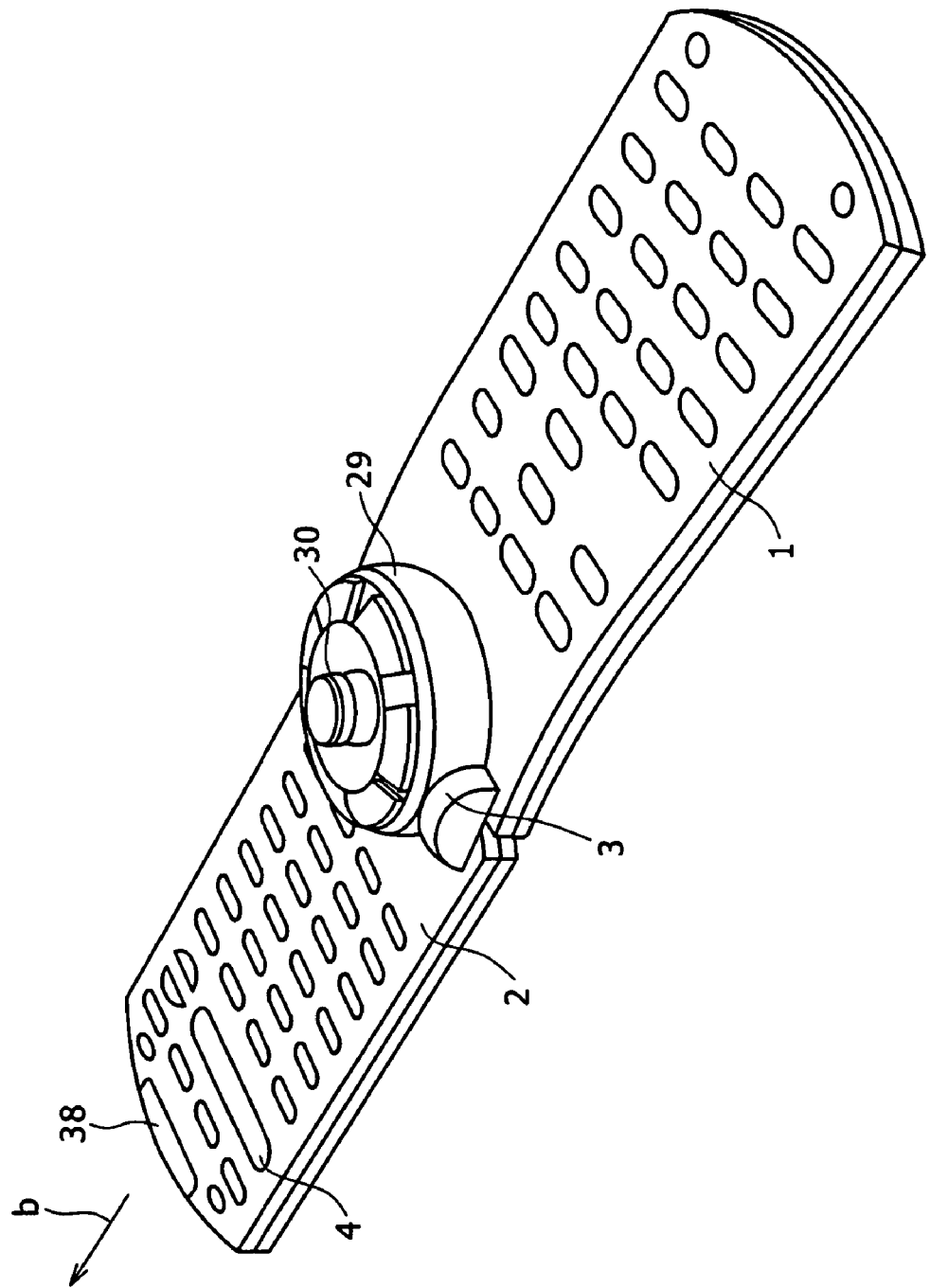
FIG. 5 is a perspective view of the input apparatus of FIG. 1 in an unfolded state as viewed from above.
Figure 6:
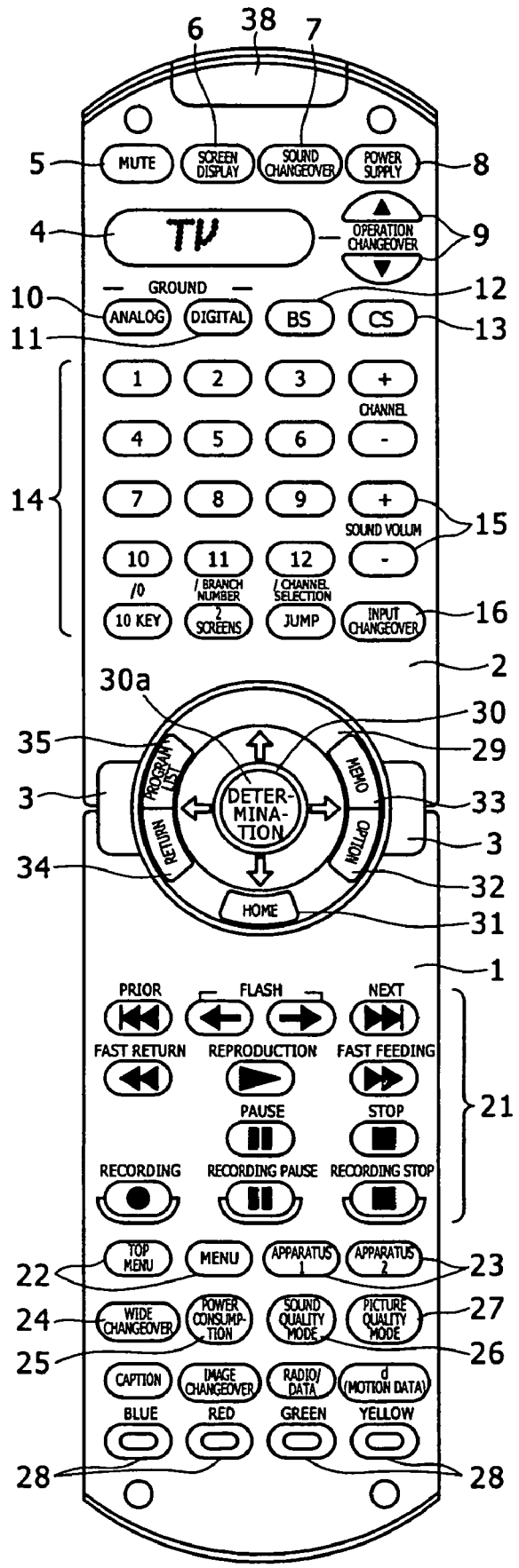
FIG. 6 is a plan view of the input apparatus of FIG. 1 in the unfolded state.

Referring first to FIGS. 1 to 7, the remote commander of the present embodiment includes a remote commander body housing section 1 having a joystick control section hereinafter described and serving as a first operation housing principally gripped by a user and a remote commander movable housing section 2 serving as a second operation housing. The remote commander body housing section 1 and the remote commander movable housing section 2 are connected on one-end sides thereof to each other by a hinge section 3 such that the remote commander movable housing section 2 can be pivoted arbitrarily between a position wherein it is folded on the remote commander body housing section 1 side as seen in FIG. 1 and another position wherein it is unfolded and lies in a substantially same plane as the remote commander body housing section 1 as seen in FIG. 5.

Now, functions of operation buttons provided on a principal face of the remote commander movable housing section 2 are described. A display section 4 is formed from, for example, a liquid crystal display panel which displays, where the apparatus to be controlled by the remote commander is the television set, the characters of "TV", but displays, where the apparatus to be operated is a video tape recorder, the characters of "VTR". A "mute" operation button 5, a "screen display" operation button 6, a "sound changeover" operation button 7 and a "power supply" operation button 8 are provided at an upper portion with respect to the display section 4.

"Operation changeover" operation buttons 9 for changing over the apparatus to be controlled are provided on a side portion with respect to the display section 4.

An "analog" operation button 10 for selecting a ground wave analog broadcast, a "digital" operation button 11 for selecting a ground wave digital broadcast, a "BS" operation button 12 for selecting a BS broadcast and a "CS" operation button 13 for selecting a CS broadcast are provided at a location of the main face of the remote commander movable housing section 2 below the display section 4. Further, channel changeover buttons 14 including buttons from "1" to "12" for changing over the channel of an apparatus in which a tuner is incorporated, sound volume adjustment buttons 15 and an "input changeover" operation button 16 for changing over between the television set and an external input apparatus are provided on the main face of the remote commander movable housing section 2.

Figure 2:
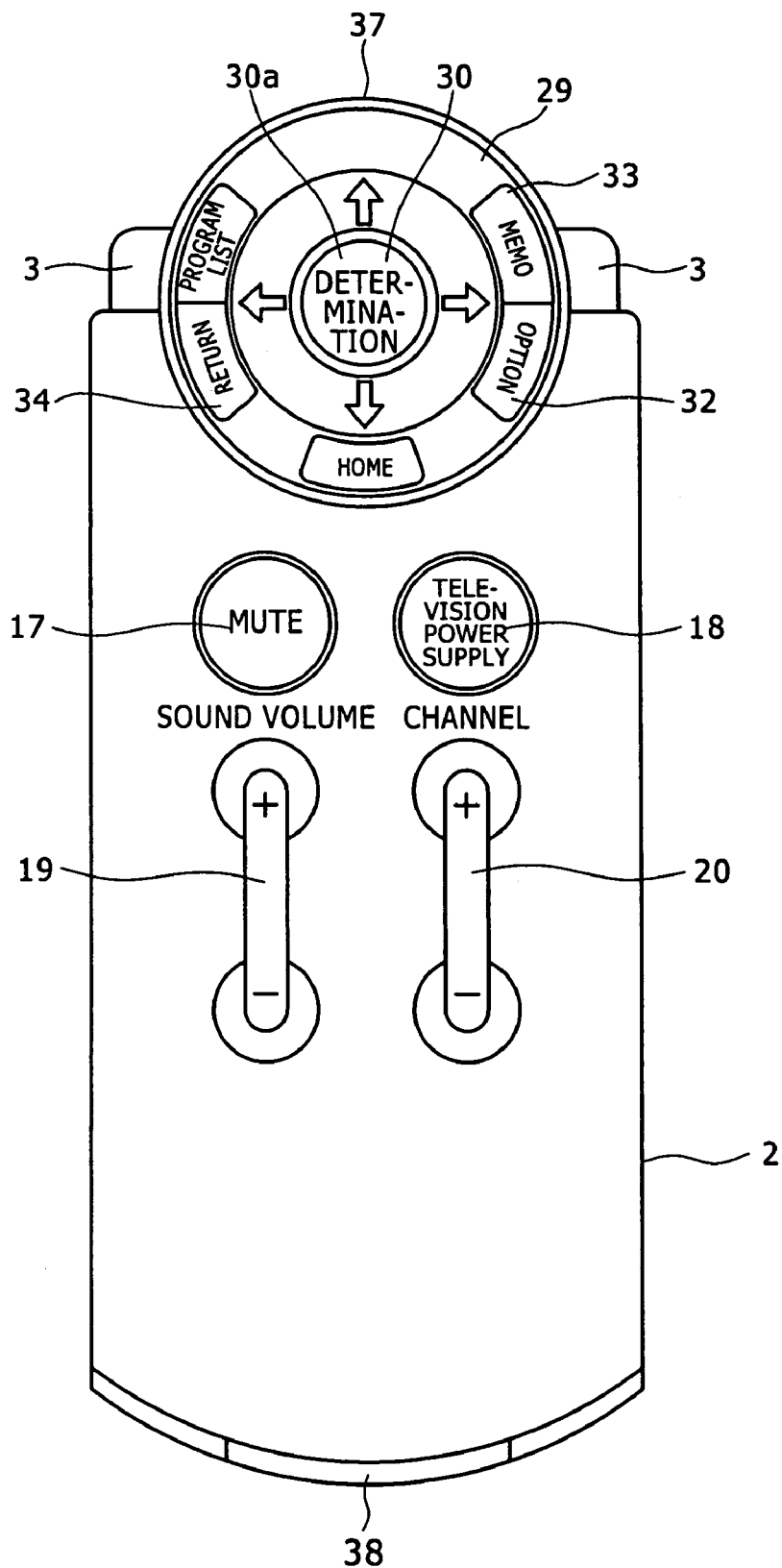
FIG. 2 is a plan view of the input apparatus of FIG. 1.

A "mute" operation button 17, a "TV power supply" operation button 18, a button 19 for sound volume adjustment and a button 20 for channel changeover are provided on the back face of the remote commander movable housing section 2 as seen in FIG. 2.

Meanwhile, operation buttons 21 for reproduction/recording of a video apparatus, a DVD apparatus, a hard disk recorder or the like are provided on a principal face of the remote commander body housing section 1. Operation buttons 22 for displaying a menu and an operation button 23 for selecting a component apparatus when a composite apparatus such as a video tape recorder integrated with a DVD apparatus is to be controlled are provided on the principal face of the remote commander body housing section 1 below the operation buttons 21. Further, an operation button 24 for changeover regarding a wide screen, an operation button 25 for power consumption, a sound quality mode operation button 26 and a picture quality mode operation button 27 are provided below the operation buttons 21. Furthermore, operation buttons 28 to be operated in order to respond to an instruction of the screen in a digital broadcast or the like are provided.

Here, a joystick control section which is a characteristic part of the remote commander of the present embodiment is described.

A joystick control section 29 for controlling a cross media bar (XMB) (registered trademark) is formed integrally with the housing of the remote commander body housing section 1 and positioned in a rising fashion on the center axis of the hinge section 3 on the remote commander body housing section 1. Therefore, such hinge sections 3 are disposed in pair at the positions on the opposite left and right sides of the joystick control section 29.

The cross media bar function operates such that, when the joystick control section 29 is operated, a menu screen including, for example, a plurality of icons representative of different types of broadcasts and, for example, a plurality of channel numbers corresponding to one of the icons is displayed in a cross shape, for example, on the television screen being watched and one of the menus displayed can be selected by adjusting and determining a desired channel number of a desired broadcast to a predetermined position of the menu screen.

The joystick control section 29 is described more in detail. A joystick 30 having a determination button 30a for being moved in a direction in the plane of FIG. 2 (Z-axis direction) is provided at a central portion of the joystick control section 29. The joystick 30 has a joystick function of moving an icon or a channel number to the predetermined position on a menus screen when it is rocked in any of upward and downward and leftward and rightward directions (directions of the X-Y axes). Further, a "home" operation button 31 for displaying a home (for ground wave analog broadcasting) menu screen, an "option" operation button 32 for displaying a next menu screen by shortcut (jump) without restoring the original menu screen, a "memo" operation button 33 for displaying a memo screen, a "return" operation button 34 for restoring the preceding screen and a "program list" operation button 35 for displaying a television program list are provided on an outer circumferential portion of the joystick 30.

The joystick control section 29 described above can itself perform operations similar to those of the operation buttons provided on the remote commander body housing section 1 and the remote commander movable housing section 2. For example, by operating the joystick control section 29 and the operation buttons provided on the back face of the remote commander movable housing section 2 while the remote commander movable housing section 2 is held in the folded state, same operations as those performed using the operation buttons on the principal faces of the remote commander body housing section 1 and the remote commander movable housing section 2 can be performed.

Since the joystick control section 29 described above is provided on the hinge sections 3 of the remote commander body housing section 1, the remote commander movable housing section 2 has a cutaway portion 36 formed by cutting away a portion thereof on the hinge section 3 side in a crescent shape such that the portion clears the joystick control section 29. Thus, where the remote commander movable housing section 2 is in the folded state, a semicircle of the outer circumferential portion of the joystick control section 29 is exposed from the remote commander body housing section 1 and the remote commander movable housing section 2 as seen in FIG. 1.

The joystick control section 29 has such a configuration as described above. Thus, when the remote commander movable housing section 2 is folded or unfolded, the cutaway portion 36 turns in such a manner as to pass over the joystick control section 29 as seen in FIG. 4. Besides, since the gap between the joystick control section 29 and the cutaway portion 36 is very small, a finger or some other foreign article is not admitted into the gap between the joystick control section 29 and the cutaway portion 36 when the remote commander movable housing section 2 is in an intermediate position between the folded and unfolded positions.

The remote commander described above further includes two transmission sections 37 and 38 for transmitting a signal of infrared rays or the like to a reception section of an apparatus such as the television set or a video player. The transmission sections 37 and 38 may each be formed from a light emitting diode (LED), which is covered with a synthetic resin material which passes infrared rays therethrough. The first transmission section 37 is provided on the exposed semicircle of the outer circumferential portion of the joystick control section 29, and the second transmission section 38 is provided at an end portion of the remote commander movable housing section 2 remote from the hinge sections 3.

In particular, the two transmission sections 37 and 38 are changed over in use depending upon whether the remote commander movable housing section 2 is in the folded state or in the unfolded state. In particular, when the remote commander movable housing section 2 is in the folded state, the first transmission section 37 can transmit a signal a corresponding to an operation of the remote commander as seen in FIG. 1. On the other hand, when the remote commander movable housing section 2 is in the unfolded state, the second transmission section 38 can transmit a signal b as seen in FIG.

5 taking it into consideration that the remote commander movable housing section 2 makes an obstacle which deteriorates the directivity of the first transmission section 37.

Figure 7:
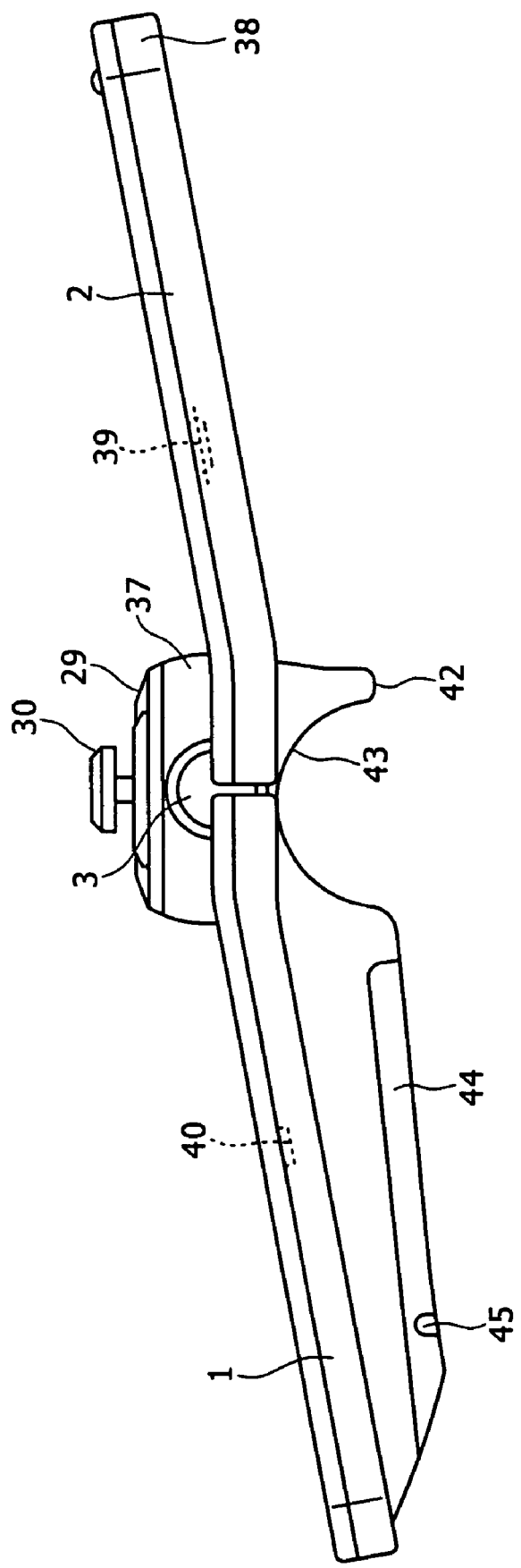
FIG. 7 is a side elevational view of the input apparatus of FIG. 1 in the unfolded state.

For the changeover between the first and second transmission sections 37 and 38, a reed switch (also called proximity switch) which is switched on and off by magnetic force of a permanent magnet. For example, a permanent magnet 40 is attached to a circuit board not shown of the remote commander body housing section 1 and a reed switch 39 is attached to another circuit board not shown of the remote commander movable housing section 2 as seen in FIG. 7.

Where the changeover mechanism is configured in this manner, when the remote commander movable housing section 2 is folded, the reed switch 39 approaches the permanent magnet 40 of the remote commander body housing section 1 side and is placed into an on state by an influence of magnetic force of the permanent magnet 40 thereby to enable the first transmission section 37 to transmit a signal a. On the other hand, when the remote commander movable housing section 2 is unfolded, the reed switch 39 is changed over to an off state without being influenced by the permanent magnet 40 on the remote commander body housing section 1 side thereby to enable the second transmission section 38 to transmit a signal b. Consequently, unnecessary consumption of the battery can be suppressed.

Figure 8:
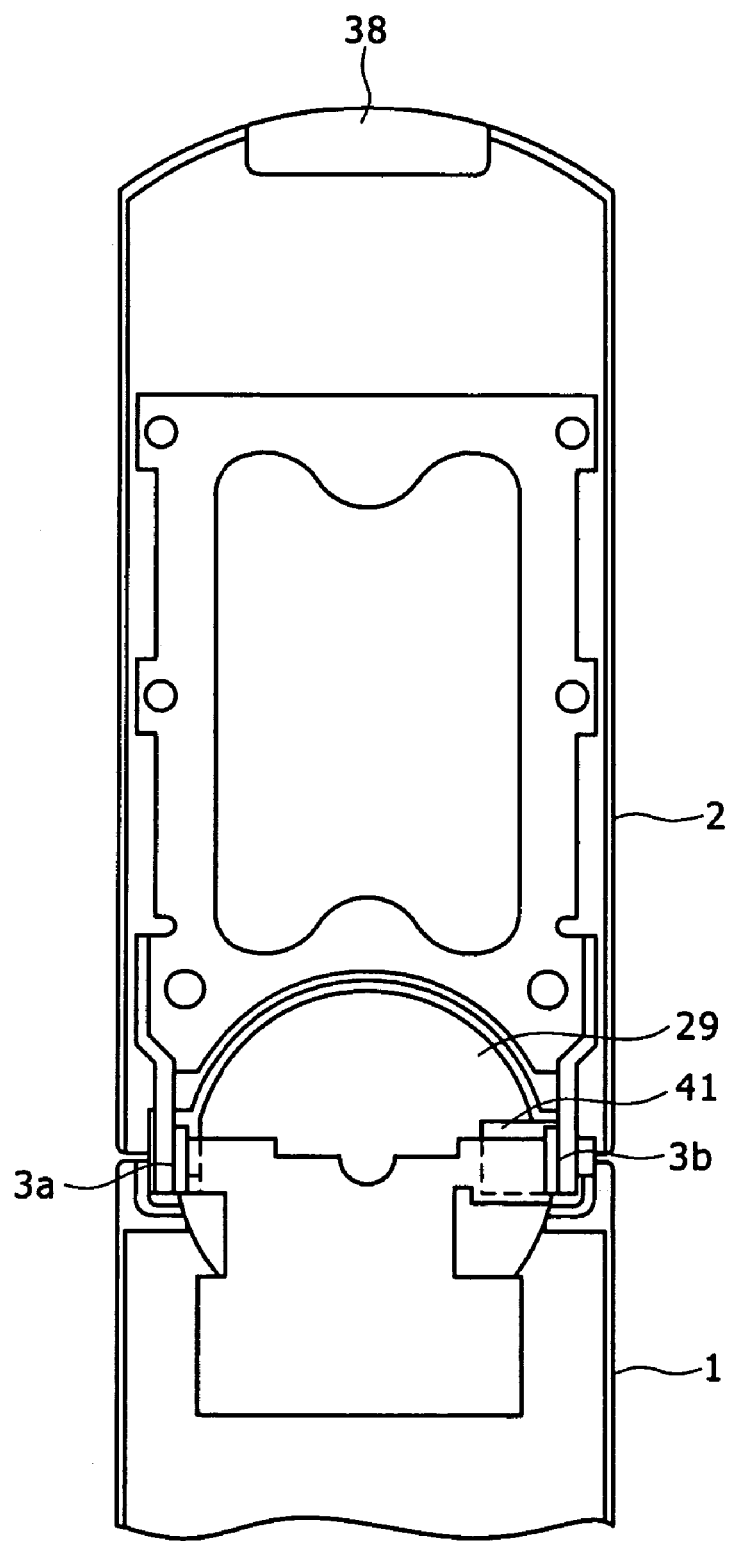
FIG. 8 is a plan view showing a configuration of a hinge section of the input apparatus of FIG. 1.

A configuration of the hinge sections 3 disposed in pair on the opposite left and right sides of the joystick control section 29 is shown in FIG. 8. In FIG. 8, the left and right elements are denoted by 3a and 3b, and the hinge section 3a acts as a support shaft portion while the other hinge section 3b includes a shaft portion and a friction mechanism 41 provided coaxially on the inner side of the support shaft portion thereof. In particular, since the friction mechanism 41 is provided for the hinge section 3, when the remote commander movable housing section 2 comes to a position immediately before the folded position or the unfolded position, it is biased toward the position. Consequently, the remote commander movable housing section 2 can be held at the folded position or the unfolded position with certainty. Particularly, the joystick control section 29 can be operated readily with the thumb.

Further, since the friction mechanism 41 is disposed on the inner side of the support shaft portion of the hinge section 3b, it can be accommodated in a space of the housing of the joystick control section 29. Consequently, the hinge sections 3 do not themselves project from the remote commander body housing section 1, and the appearance of the remote commander is not damaged by the hinge sections 3.

It is to be noted that a projection 42 is provided at an end portion of a rear face of the remote commander body housing section 1 on the joystick control section 29 side as seen in FIG. 3, and a recess 43 of a semi-arcuate shape is formed such that it extends from the projection 42 to the rear face of the remote commander body housing section 1. When a user holds the remote commander body housing section 1, it can hold the remote commander readily by catching the recess 43 with the forefinger.

The remote commander body housing section 1 has, on the rear face thereof, a battery accommodating section for accommodating, for example, AA dry cells serving as a power supply for the remote commander, and batteries can be exchanged by opening a battery lid 44 for the battery accommodation section.

Further, two holding faces 45 are provided on the battery lid 44. Thus, when the remote commander is placed on a table, it can be placed stably at three points of the two holding faces 45 and an end portion of the projection 42 at which the recess 43 is formed as seen in FIG. 3.

Figure 9:
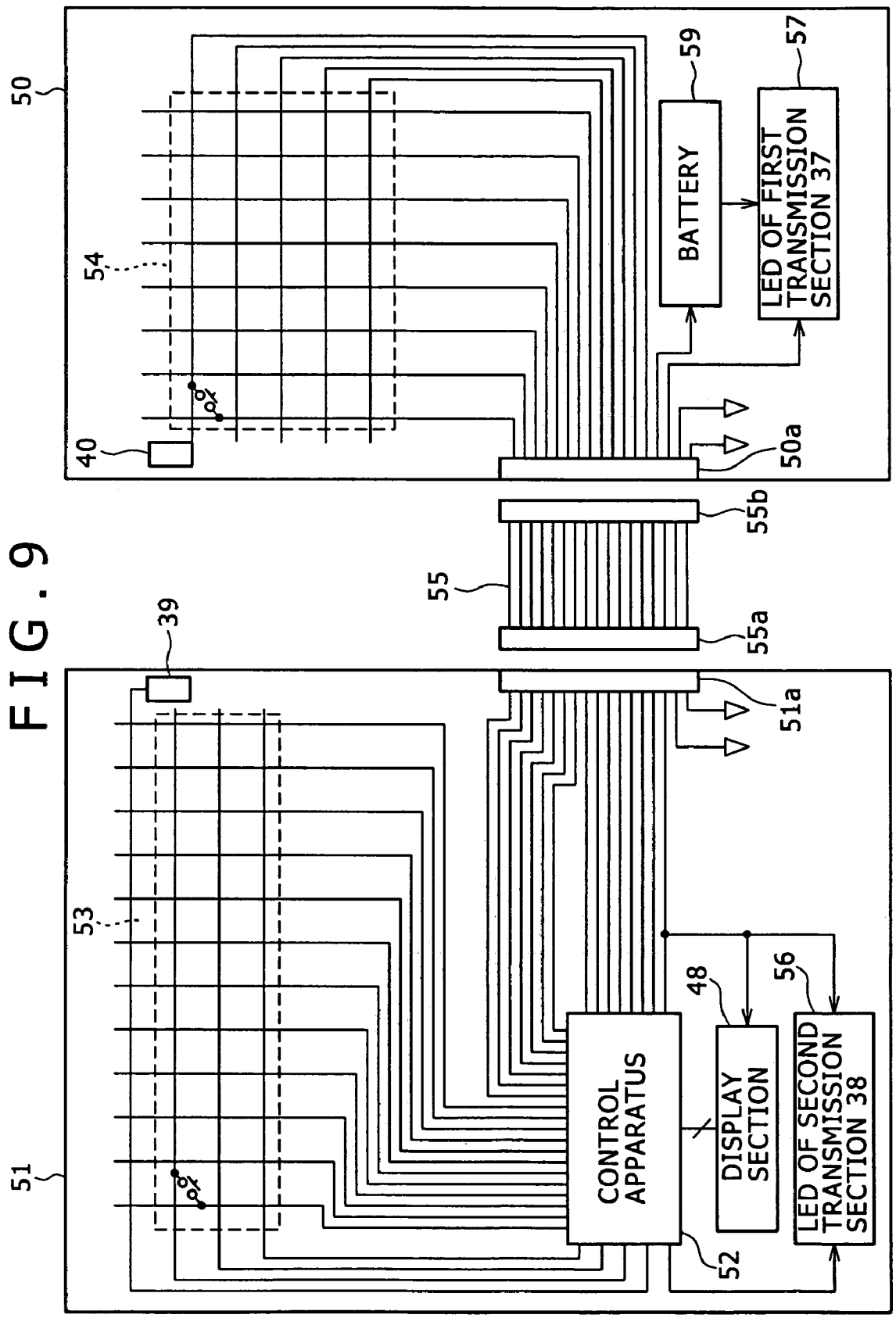
FIG. 9 is a block diagram showing an electric configuration of the input apparatus of FIG. 1.

In the present embodiment, a sub circuit board 50 formed from such a circuit board as shown in FIG. 9 is disposed in such a manner as seen in FIG. 10A in the remote commander body housing section 1 which includes the joystick control section 29 as the first operation housing of the remote commander which is principally held by the user. Further, a main circuit board 51 formed from such a circuit board as shown in FIG. 9 is disposed in such a manner as seen in FIGS. 10A and 10B in the remote commander movable housing section 2 which is a second operation housing.

Referring to FIG. 9, a control apparatus 52 formed from a microcomputer is provided on the main circuit board 51. A key code signal from a key matrix 53 which is controlled by the operation buttons provided on the opposite faces of the main circuit board 51 is supplied to the control apparatus 52.

Referring to FIG. 10A, the key matrix 53 includes keys corresponding to the input buttons provided on the principal face of the remote commander movable housing section 2, that is, the "mute" operation button 5, "screen display" operation button 6, "sound changeover" operation button 7, "power supply" operation button 8, "operation changeover" operation buttons 9, "analog" operation button 10, "digital" operation button 11, "BS" operation button 12, "CS" operation button 13, channel changeover buttons 14, sound volume adjustment buttons 15 and "input changeover" operation button 16. Thus, a key code signal corresponding to an operated one of the keys from the key matrix 53 is supplied to the main control apparatus 52.

Further, the key matrix 53 includes keys corresponding to the input buttons provided on the back face of the remote commander movable housing section 2, that is, the "mute" operation button 17, "TV power supply" operation button 18, button 19 for sound volume adjustment and button 20 for channel changeover. Thus, a key code signal corresponding to an operated one of the keys from the key matrix 53 is supplied to the main control apparatus 52.

The control apparatus 52 generates a control code signal corresponding to a key code signal of an operated one of the operation buttons.

Further, a key code signal corresponding to a key from a key matrix 54 provided on the sub circuit board 50 is supplied to the control apparatus 52 provided on the main circuit board 51 through a connection cable 55.

The key matrix 54 includes such keys corresponding to the input buttons provided on the principal face of the remote commander body housing section 1 as seen in FIG. 10A, that is, the operation buttons 21 for reproduction/recording, operation buttons 22 for displaying a menu, operation buttons 23 for selecting a component apparatus, operation button 24 for changeover regarding a wide screen, operation button 25 for power consumption, sound quality mode operation button 26, picture quality mode operation button 27 and operation buttons 28 to be operated in order to respond to an instruction of the screen. Thus, a key code signal corresponding to an operated one of the keys from the key matrix 54 is supplied to the control apparatus 52.

Further, the key matrix 54 further includes such keys corresponding to the input buttons provided on the joystick control section 29 as seen in FIGS. 10A and 10B, that is, the joystick 30 for issuing an instruction of movement in the upward, downward, leftward or rightward direction and determination button 30a, "home" operation button 31, "option" operation button 32, "memo" operation button 33, "return" operation button 34 for restoring the preceding screen and "program list" operation button 35. Thus, a key code signal corresponding to an operated one of the keys from the key matrix 54 is supplied to the control apparatus 52. The control apparatus 52 generates a control code signal in response to an operation of any of the input buttons.

A control code signal generated by the control apparatus 52 is supplied to an infrared light emitting diode (LED) 56 of the second transmission section 38 provided on the main circuit board 51 and supplied to another infrared light emitting diode (LED) 57 of the first transmission section 37 provided on the sub circuit board 50 through the connection cable 55.

A display section 48 formed from a liquid crystal display (LCD) panel is provided on the main circuit board 51, and a display signal from the control apparatus 52 is supplied to the display section 48. Further, if the apparatus to be controlled by the remote commander as described above is, for example, the television set, then the characters of "TV" are displayed on the display section 48, but if the apparatus to be controlled is a video tape recorder, then the characters of "VTR" are displayed on the display section 48.

In FIG. 9, a battery 59 is provided on the sub circuit board 50 such that power from the battery 59 is supplied to the infrared light emitting diode 57 of the first transmission section 37. Further, the power from the battery 59 is supplied to the control apparatus 52, the infrared light emitting diode 56 of the second transmission section 38 and the display section 4 through the connection cable 55.

Further, the reed switch 39 of the remote commander movable housing section 2 is provided on the main circuit board 51. The reed switch 39 is positioned such that it is opposed to the permanent magnet 40 provided on the sub circuit board 50 so that the reed switch 39 is switched on when the remote commander movable housing section 2 is folded.

The on/off signal of the reed switch 39 is supplied to the control apparatus 52. When the reed switch 39 is on, the control apparatus 52 supplies a control code signal from the control apparatus 52 to the first transmission section 37 but does not supply the control code signal to the second transmission section 38 and besides does not supply power to the display section 4. The power consumption can be reduced thereby.

On the other hand, when the reed switch 39 is off, the control apparatus 52 supplies the control code signal from the control apparatus 52 to the second transmission section 38 but does not supply the control code signal to the first transmission section 37.

Figure 11:
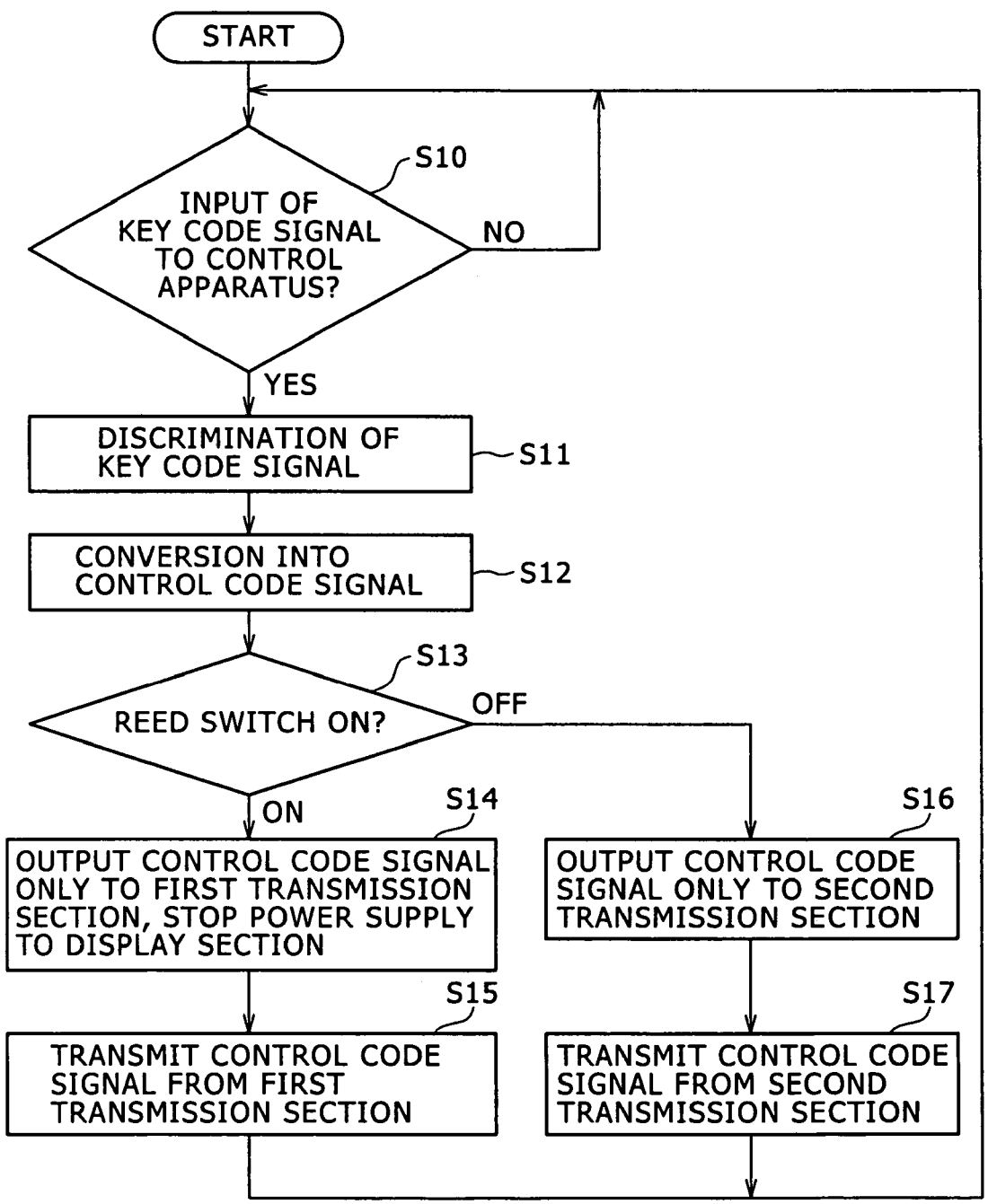
FIG. 11 is a flow chart illustrating operation of the input apparatus of FIG. 9.

Action of the control apparatus 52 is described below with reference to a flow chart of FIG. 11. After action is started, the control apparatus 52 decides whether or not an input of a key code signal is received (step S10). If no input of a key code signal is received, then this decision is repeated, but if an input of a key code signal is received, then the control apparatus 52 discriminates the key code signal (step S11) and then advances its processing to step S12.

At step S12, the control apparatus 52 converts the key code signal into a corresponding control code signal. Thereafter, the control apparatus 52 decides whether or not the reed switch 39 is on (step S13).

If the reed switch 39 is on, then since the remote commander movable housing section 2 is in the folded state, the control code signal from the control apparatus 52 is outputted only to the first transmission section 37 but is not outputted to the second transmission section 38 and besides power is not supplied to the display section 4 (step S14).

Thereafter, the control code signal is transmitted from the first transmission section 37 to the light reception section of an electronic apparatus of an object of control, for example, of the television set (step S15) so that desired control of the electronic apparatus is performed. Thereafter, the processing returns to step S10.

On the other hand, if the reed switch 39 is off at step S13, then the control apparatus 52 outputs the control code signal only to the second transmission section 38 (step S16) but does not output the control code signal to the first transmission section 37. Thereafter, the control code signal is transmitted from the second transmission section 38 to the light reception section of the control object electronic apparatus such as, for example, the television set (step S17) so that desired control of the electronic apparatus is performed. In FIG. 9, a connector 50a is connected to a connector 55b of the connection cable 55 of the sub circuit board 50, and another connector 51a is connected to the other connector 55a of the connection cable 55 of the main circuit board 51.

According to the input apparatus of the present embodiment, in whichever one of the folded state and the unfolded state the input apparatus is, the input apparatus can transmit a signal with certainty to a signal reception section such as a television set and has a high operability. Also it is easy to handle the input apparatus and is possible to form the input apparatus in a compact form.

Further, according to the input apparatus of the present embodiment, the first transmission section 37 is provided on the exposed semi-circular portion of the outer circumferential portion of the joystick control section 29 while the second transmission section 38 is provided at an end portion of the remote commander movable housing section 2 serving as a second operation section. Consequently, a signal of infrared rays or the like transmitted from the transmission section is not intercepted.

Further, according to the input apparatus of the present embodiment, since the first transmission section 37 and the second transmission section 38 are infrared ray transmission sections and the remote commander movable housing section 2 is changed over between the folded state and the unfolded state, unnecessary consumption of the batteries can be suppressed.

Here, an example wherein the joystick control section 29 is operated to select a channel of a television broadcast is described with reference to FIGS. 12 and 13.

A procedure of operation, for example, for changing over from a state wherein the channel "1" of a ground wave analog broadcast is being enjoyed to another state wherein a BS digital broadcast is enjoyed is described. First, if the "home" operation button 31 of the joystick control section 29 is operated while the channel "1" of a ground wave analog broadcast is being enjoyed, then such a menu screen of a cross media bar as shown in FIG. 12 is displayed on the viewed screen. On a horizontal axis of the menu screen, category icons of "setting", "photo", "video", "ground", "BS", "CS" and "external input" are displayed in order from the left. If the "home" operation button 31 is operated, then a focus F is set to a location below the category icon of "ground" is set. Channel numbers "1", "3", "4" and "5" are displayed below the category icon of "ground", and one of the channel numbers is displayed in the focus F. Further, a program list is displayed at a location above the category icon of "ground". From the fact that the channel number "1" is displayed in the focus F on the menu screen, it can be identified that the channel "1" of a ground wave analog broadcast is being enjoyed.

It is to be noted that, if the joystick 30 is operated in the direction of a downward arrow mark while the menu screen is displayed, then the channel number of "3" or "4" moves into the focus F, and if the determination button 30a of the joystick 30 is operated, then a ground wave analog broadcast of the channel "3" or "4" can be enjoyed.

Figure 12:
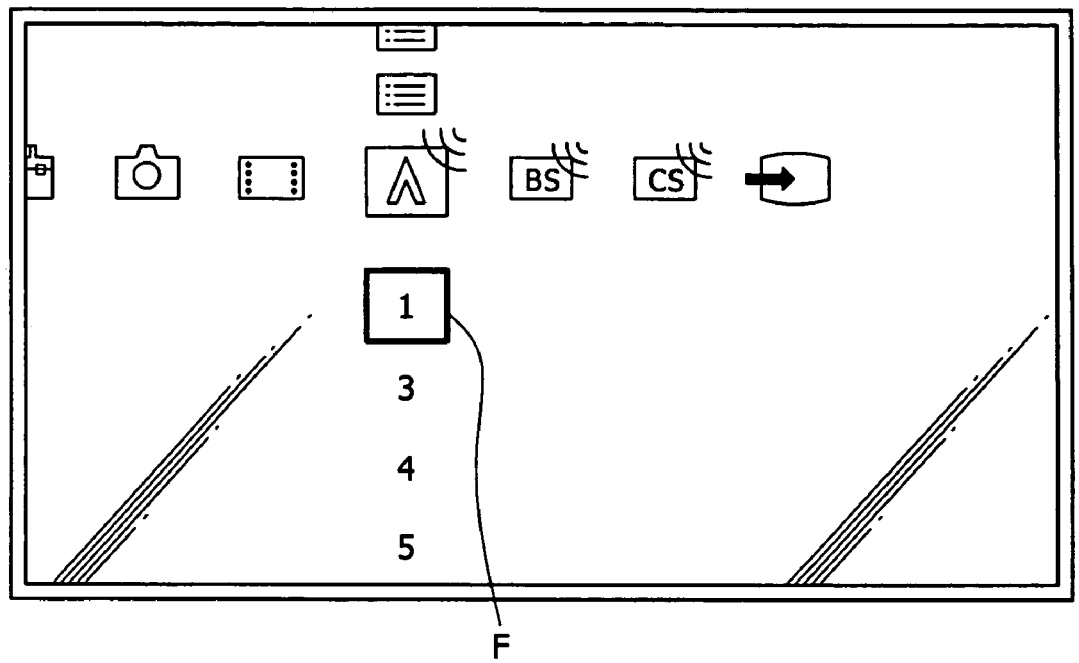
FIG. 12 is a menu screen of a cross media bar when the "home" operation button of the joystick control section is operated.
Figure 13:
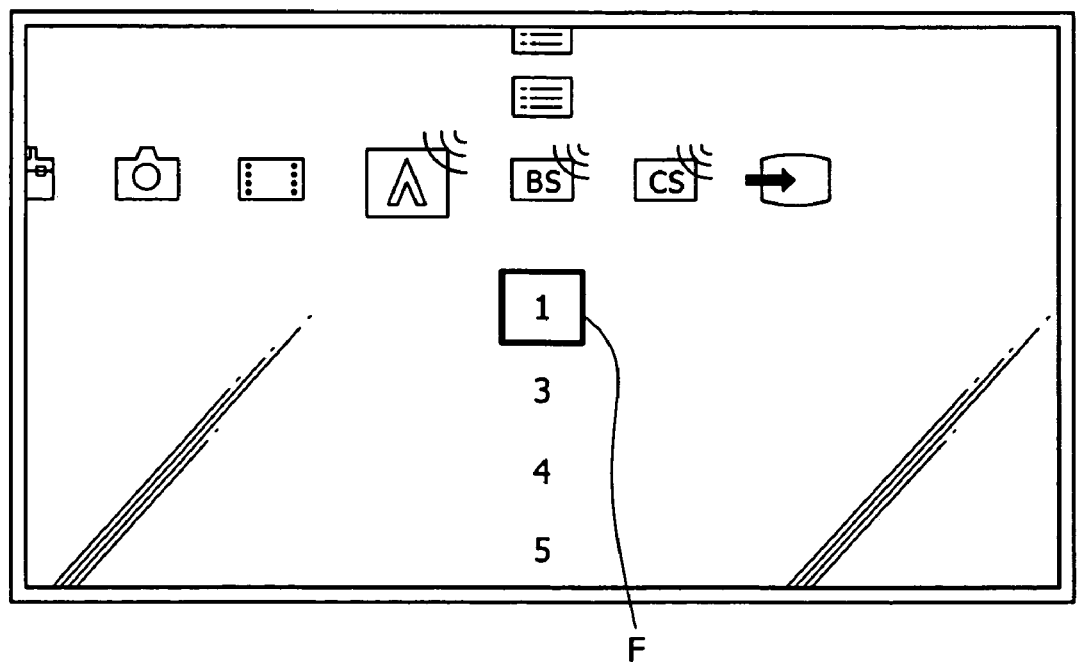
FIG. 13 is a screen when a BS digital broadcast is selected from the menu screen of FIG. 12.

In order to select a BS digital broadcast from the menu screen of FIG. 12, the joystick 30 is operated in the direction indicated by a rightward arrow mark thereon, whereupon the focus F moves to the category icon of "BS" and the screen changes over to another menu screen shown in FIG. 13. Then, below the category icon of "BS", "1", "3", "4" and "5" are displayed. In FIG. 13, the focus F is set to the channel "1". This channel "1" signifies the BS1. Here, if the determination button 30a of the joystick 30 is operated while the channel "1" is focused in this manner, then the cross media bar disappears and the BS1 of a BS digital broadcast is enjoyed.

Thereafter, when a broadcast is to be selected, the "home" operation button 31 of the joystick control section 29 may be operated, and then the joystick 30 may be operated on the menu screen of the cross media bar shown in FIG. 12 to select a broadcast of a predetermined category.

It is to be noted that, while the foregoing description is given taking a remote commander for controlling a television set and a video apparatus as an example, the remote commander of the present invention can be applied widely also as a remote commander for a DVD player, a video tape recorder integrated with a DVD player and so forth.

While a preferred embodiment of the present invention has been described using specific terms, such description is for illustrative purposes only, and it is to be understood that changes and variations may be made without departing from the spirit or scope of the following claims.

The invention claimed is:

1. An input apparatus, comprising:
a first operation housing having a plurality of first input buttons for performing a first group of functions, the first operation housing being adapted principally to be held;
a second operation housing having a plurality of second input buttons for performing a second group of functions and a plurality of third input buttons for performing a third group of functions;
a hinge section connecting the second operation housing to the first operation housing for pivotal movement between a folded position and an unfolded position, the third input buttons being operable while the first input buttons and the second input buttons are disposed between the first operation housing and the second operation housing in the folded position; and
a joystick control section disposed integrally with the first operation housing on a center line of the hinge section and having an outer circumferential portion provided with fourth input buttons for performing functions corresponding to the first group of functions and the second group of functions;
the joystick control section being exposed in both the folded position and the unfolded position so that input operations can be performed using the fourth input buttons.

2. The input apparatus according to claim 1, wherein the second operation housing includes a crescent-shaped cutaway portion adjacent the hinge section, and the second operation housing is moved between the folded position and the unfolded position such that the cutaway portion passes over the joystick control section.

3. The input apparatus according to claim 2, wherein a gap is defined between the joystick control section and the cutaway portion when the second operation housing is positioned intermediate the folded position and the unfolded position, the gap having a size such that a finger cannot be inserted into the gap.

4. The input apparatus according to claim 1, wherein the third input buttons are used with a comparatively high frequency.

5. The input apparatus according to claim 1, wherein the input apparatus is a remote commander for an electronic apparatus.

6. An input apparatus, comprising: a first operation housing having a plurality of first input buttons for performing a first group of functions, the first operation housing being adapted principally to be held; a second operation housing having a plurality of second input buttons for performing a second group of functions; a hinge section connecting the second operation housing to the first operation housing for folding movement between a folded position and an unfolded position; and a pair of signal transmission sections including a first transmission section which serves as a signal transmission section when the second operation housing is in the folded position and a second transmission section which serves as a signal transmission section when the second operation housing is in the unfolded position; and a joystick control section disposed integrally with the first operation housing on an axis of the hinge section and having an outer circumferential portion provided with a plurality of third input buttons for performing functions corresponding to the first group of functions and the second group of functions; the joystick control section being exposed in both the folded position and the unfolded position so that input operations can be performed using the plurality of third input buttons.

7. The input apparatus according to claim 6, wherein the second operation housing has a plurality of fourth input buttons for performing a fourth group of functions, the fourth input buttons being operable while the first input buttons and the second input buttons are disposed between the first operation housing and the second operation housing in the folded position.

8. The input apparatus according to claim 6, wherein the first transmission section is provided on the hinge section, and the second transmission section is provided at an end of the second operation housing remote from the hinge section.

9. The input apparatus according to claim 6, wherein the first and second transmission sections are formed as infrared transmission sections which are changed over depending upon whether the second operation housing is in the folded position or in the unfolded position.

10. The input apparatus according to claim 6, further comprising a main circuit board disposed in the second operation housing and having a control apparatus provided thereon, and a sub circuit board disposed in the first operation housing.

11. The input apparatus according to claim 6, wherein the input apparatus is a remote commander for an electronic apparatus.

* * * * *